United States Patent [19]
Bolles

[11] 3,779,942
[45] Dec. 18, 1973

[54] CAPSULES AND PROCESS FOR FORMING CAPSULES

[75] Inventor: Theodore F. Bolles, Woodbury, Minn.

[73] Assignee: Minnesota Mining and Manufacturing Company, St. Paul, Minn.

[22] Filed: Dec. 4, 1970

[21] Appl. No.: 95,036

[52] U.S. Cl............ 252/316, 8/79, 99/140 R, 99/166, 117/100 A, 117/100 B, 252/10, 252/89, 252/DIG. 3, 264/4, 424/33, 424/35, 424/37, 424/38
[51] Int. Cl...... B01j 13/02, B29c 13/00, B44d 1/02
[58] Field of Search............... 252/316; 117/100 A, 117/100 B; 264/4; 424/38, 35

[56] References Cited
UNITED STATES PATENTS
2,512,192  6/1950  Yen et al. .................. 424/32
3,154,494  10/1964  Speak et al. ................. 252/96
3,423,489  1/1969  Arens et al. .................. 264/4
3,069,370  12/1962  Jensen et al. ................. 252/316 X Primary Examiner—Richard D. Lovering
Attorney—Kinney, Alexander, Sell, Steldt & Delahunt

[57] ABSTRACT

Capsules having an improved vapor barrier together with improved shell thickness, uniformity and strength comprise a central core of liquid fill material surrounded and enclosed by an outer shell, said shell containing at least one soluble surfactant in particular, sodium dioctylsulfosuccinate, sodium carboxymethyl cellulose, sorbitan sesquioleate, silicones, interpolymer of methyl vinyl ether and maleic anhydride, mixtures thereof, or fluorocarbon compounds.

8 Claims, 1 Drawing Figure

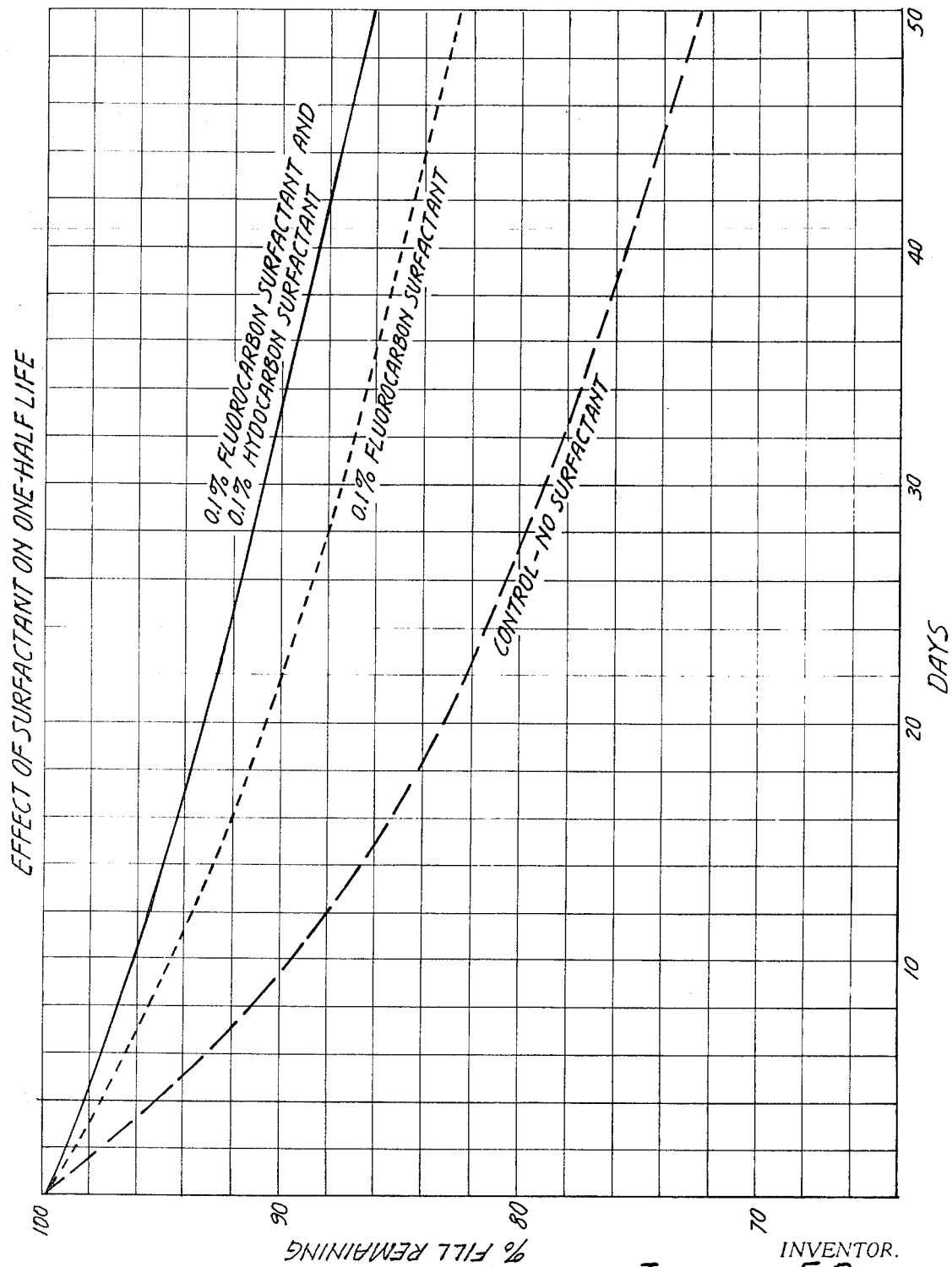

CAPSULES AND PROCESS FOR FORMING CAPSULES

BACKGROUND OF THE INVENTION

The invention relates to improved capsules.

A wide variety of materials, including adhesives, dyes, cleaning solutions, foods, lubricants, pesticides, etc., have been packaged in relatively small capsules for release at a later time by rupture of the capsule shell wall. Such capsules typically comprise a shell material surrounding and enclosing a central core of liquid material and are typically ruptured by heat, pressure and/or dissolution when release of the capsule contents is desired.

Several techniques of preparing these capsules are known, the most common being formation of concentric tubes or biliquid columns of shell material around liquid fill material and causing the column to break up and solidify in the form of spheroid capsules. U.S. Pat. No. 3,423,489 discloses a particularly useful method of forming capsules, indicating that optimum results are obtained by including surfactant in the fill liquid. These capsules, while suitable for some commercial uses, often have not had sufficient shell strength and uniformity. Also, the capsule shells have not provided an adequate vapor-barrier to some liquids. Furthermore, it has not readily been possible to effectively encapsulate alcohol solutions in wax shells; nor organic solutions in shells such as sugars, gelatin, water soluble material, or polymers such as hydroxypropyl cellulose, methyl cellulose and other natural and synthetic gums.

SUMMARY OF THE INVENTION

The invention provides capsules the shells of which have improved strength and uniformity. Resistance of the shell to passage of fill vapors is increased. Practice of the invention makes possible encapsulation of alcohol solutions in wax shells, organic solutions in shells such as sugars, gelatin, water soluble material, or polymers such as hydroxypropyl cellulose, methyl cellulose and other natural and synthetic gums.

In accordance with the invention, the capsules comprise a central core of liquid fill material surrounded and enclosed by an outer shell, said shell containing at least one soluble surfactant.

BRIEF DESCRIPTION OF THE DRAWING

The drawing graphically illustrates the improved half-life (time for one-half of the fill to evaporate through the shell) obtained by incorporation of surfactant in the shell. The lower line depicts the percent fill remaining at various time intervals in a capsule shell without surfactant and corresponds to Example 1 herein. The center line depicts the percent fill remaining at various time intervals in a capsule shell containing 0.1% fluorocarbon surfactant and corresponds to Example 2 herein. The upper line depicts the percent fill remaining at various time intervals in a capsule shell containing 0.1% sorbitan sesquioleate surfactant and 0.1% fluorocarbon surfactant and corresponds to Example 6 herein.

DESCRIPTION OF THE PREFERRED EMBODIMENTS

The capsule shells may comprise such materials as hydrocarbon waxes, hydrocarbon polymers, gelatins, sugars, water soluble polymers such as hydroxypropyl cellulose, methyl cellulose and other natural and synthetic gums, etc. Upon inclusion of a minor amount of at least one soluble surfactant in the shell composition, the shelf, storage, or half-life (time one-half of the fill to evaporate through the shell) of the capsules is considerably increased. Indeed, the time for one-half of the fill to evaporate through the shell is approximately doubled.

Surfactants found useful to provide the improved capsules of the invention are those which (1) are soluble in the shell composition being utilized, (2) lower the equilibrium surface tension between air and liquid shell composition by at least 2 dynes/cm, (3) improve the ability of the shell composition to wet the fill, and (4) have a boiling point greater than the temperature reached by the shell composition during encapsulation.

A surfactant is considered soluble in the shell composition if it is homogeneously dispersible in liquid shell composition having a viscosity of about 2 to about 2,000 cps at a concentration of about 0.001 to 10% by weight. Surfactants found to improve ability of the shell composition to wet the fill and provide improved capsules are those which when homogeneously dispersed in a drop of liquid shell composition at about 10°–200°C above its melting or congealing point will cause the drop to spread rapidly on fill at room temperature and not subsequently contract. Surfactants which cause the drop of liquid shell composition to rapidly spread and then slowly contract have a less than optimum effectiveness. Surfactants which cause the drop of liquid shell composition to slowly spread, but not contract, have an effectiveness considerably less than optimum. Surfactants which cause the drop of liquid shell composition to spread and rapidly contract or which do not cause spreading have not been found effective.

Typical surfactants found useful to provide the improved capsules of the invention are fluorocarbon compounds such as

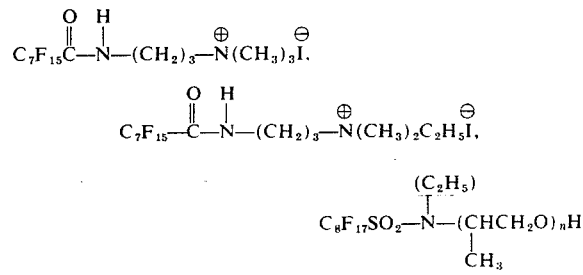

wherein $n$ represents an integer from 2 to 8 inclusive; silicones such as siloxane-oxyalkylane copolymers and dimethylsilicone polymers; and hydrocarbon surfactants such as sodiumdioctylsulfosuccinate, sodium carboxymethyl cellulose, sorbitan sesquioleate, polyoxyethylene polyol fatty acid esters, and interpolymers of methyl vinyl ether and maleic anhydride. Mixtures of several compatible surfactants may also be used.

The improved capsules of the invention are prepared by mixing at least one soluble surfactant with the liquid shell composition, thereafter providing a biliquid column comprising an outer layer of liquid shell composition and a core of liquid fill, and thereafter causing the column to break into droplets with the shell composition solidifying in the form of spheroid capsules, the fill being contained therein. This permits encapsulation of alcohols in wax shells, organic solutions in shells of sugars, gelatin, water soluble material, and polymers such as hydroxypropyl cellulose, methyl cellulose and other natural and synthetic gums. Where it has been possible to make capsules, incorporation of a soluble surfactant in the shell composition typically increases the yield of satisfactory capsules by about 50 to 100 percent, increases the shelf, storage, or half-life of the capsules by about 25 to 100 percent, provides capsules having a more uniform size distribution, increases the rate at which capsules may be produced and provides shells having improved strength and uniformity. The diameter of the capsules produced are on the order of 10 to 4000 microns.

The improved capsules obtained by practice of the invention is quite unexpected and contrary to the prior art since surfactants have previously been included in the fill to provide an optimum yield of capsules. Practice of the invention by utilizing surfactant in the shell composition unexpectedly provides outstanding results in capsule yield, shelf life, size uniformity, strength, and increased production rate.

Mixing of the surfactant with the shell composition is typically accomplished by melting the shell composition and thereafter blending in the desired amount of surfactant. The effective amount of surfactant to achieve the objects of the invention is dependent upon the particular surfactant utilized. For example, an effective amount of fluorocarbon surfactant has been found to be about 0.01 to about 1 part by weight per 100 parts of capsule shell composition. An effective amount of silicone surfactant has been found to be about 0.01 to about 5, preferably 0.1 to about 1 part per 100 parts by weight of shell composition. An effective amount of hydrocarbon surfactant has been found to be about 0.01 to about 5, preferably 0.1 to about 1 part by weight per 100 parts of shell composition.

The invention is further explained and amplified without limitation by the following examples in which all parts are by weight unless otherwise indicated.

EXAMPLES 1 – 12

These examples illustrate the increased capsule yield and increased half-life obtained by practice of the invention and further illustrate use of a variety of surfactants in a hydrocarbon wax shell composition.

Half-life of the filled capsules was determined by placing pre-weighed capsules in an open container and periodically reweighing the capsules to determine the amount of fill lost. After several weighings have been made, a graph is plotted and the time for one-half of the fill to evaporate determined. In general, practice of the invention increases capsule half-life by about 25 to 100 percent.

A capsule shell forming apparatus as described in FIG. 1 of U.S. Pat. No. 3,423,489 was utilized to prepare capsules. The fill comprised 69.98% isopropyl alcohol, 30.00% water, 0.02% carboxy vinyl polymer (commercially available from the B.F. Goodrich Company under the trade designation "Carbopol 941"), and one drop of 1N sodium hydroxide per gallon. The shell composition comprised 5.0% high molecular weight ethylene-isobutyl acrylate copolymer (commercially available from the Dow Chemical Company under the trade designation "Zetafax 1370"), 0.1% butylated hydroxy toluene antioxidant (commercially

TABLE I

| Example | Surfactant | Percent yield | Percent increase in percent yield | Half-life (years) | Percent increase in half-life |
| --- | --- | --- | --- | --- | --- |
| 1 (control) | None | 69 | | 0.40 | |
| 2 | 0.1% Fluorocarbon [1] | 84 | 21.8 | .60 | 50 |
| 3 | 0.1% Organo-Silicone [2] | 89 | 29 | .54 | 35 |
| 4 | 0.1% Sorbitan Sesquioleate [3] | 93 | 34.8 | .54 | 35 |
| 5 | 0.1% Fluorocarbon [1] | 94 | 36.2 | .55 | 37.4 |
| 6 | 0.1% Fluorocarbon [1] 0.1% Sorbitan Sesquioleate [3] | 93 | 34.8 | .69 | 72.6 |
| 7 | Polyoxyethylene Polyol fatty ester [4] | 91 | 31.9 | .59 | 47.5 |
| 8 | 0.1% Fluorocarbon [1] 0.1% Organo-Silicone [2] | 83 | 20.3 | .66 | 65 |
| 9 | 0.1 Fluorocarbon [5] | 90 | 30.4 | .60 | 50 |
| 10 | 0.1% Organo-Silicone [6] | 86 | 24.6 | .35 | −12.5 |
| 11 | 0.1% Organo-Silicone [7] | 91 | 31.9 | .46 | 15 |
| 12 | 0.1% Fluorocarbon [1] 0.1% Organo-Silicone [7] | 93 | 34.8 | | |

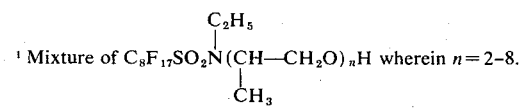

[1] Mixture of $C_8F_{17}SO_2N(CH-CH_2O)_nH$ wherein $n = 2-8$, with N-substituent $\begin{matrix} C_2H_5 \\ | \\ CH_3 \end{matrix}$

[2] Commercially available from the Union Carbide Corporation, Silicones Division, under the trade designation "L-77".

[3] Commercially available from the Atlas Chemical Company under the trade designation "Arlacel C".

[4] Commercially available from the Atlas Chemical Company under the trade designation "Arlatone T".

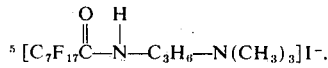

[5] $[C_7F_{17}\overset{O}{\underset{\|}{C}}-\overset{H}{\underset{|}{N}}-C_3H_6-N(CH_3)_3]I^-$.

[6] Commercially available from the Union Carbide Corporation, Silicones Division, under the trade designation "L-76".

[7] Commercially available from the Union Carbide Corporation, Silicones Division, under the trade designation "L-75".

available from Eastman Chemical Products, Inc. under the trade designation "Tenox BHT"), 94.9-X% paraffin wax having a melting point of about 140°F. and X% surfactant as shown in Table I.

Apparatus operating conditions utilized were: shell composition temperature of 110°–150°C.; fill temperature of 23°C.; and nozzle orifice diameter of 0.61 mm. Fill volume of the resultant capsules was found to be 69% and the rate of production was 11.4 pounds of capsules per hour.

Percent yield of good capsules, percent increase in percent yield, half-life in years, and percent increase in half-life were determined for each example, the results being shown in Table I.

Percent yield was determined by weighing all capsules and chaff produced, removing the fill from damaged or cracked capsules by solvent extraction or evaporation, separating the empty capsules and chaff from the good capsules by floatation in a liquid of appropriate density. Percent yield equals weight of good capsules divided by the total weight of all capsules and chaff times 100.

EXAMPLE 13

This example illustrates use of microcrystalline wax as the capsule shell.

The same fill as utilized in Examples 1–12 was encapsulated in a shell comprising 94.8% microcrystalline wax having a melting point of about 177°F, 5.0% of the high molecular weight ethylene copolymer used in Example 1, 0.1% butylated hydroxytoluene antioxidant and 0.1% surfactant comprising a mixture of

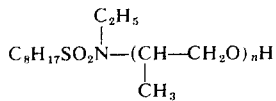

wherein $n$=2–8.

Apparatus operating conditions utilized were: shell composition temperature of 170°C; fill temperature of 23°C; and nozzle orifice diameter of 0.61 mm. Fill volume of the resultant capsules was found to be 72%.

By using surfactant, the production rate increased from 17.8 to 21.0 lbs/hour (15 percent increase), percent yield increased from 80 to 81%, and half-life increased from 0.33 to 0.42 years.

EXAMPLE 14

This example illustrates use of a fluorocarbon surfactant and an ethanol-water fill.

The shell composition utilized in Example 1 was used to encapsulate a fill comprising 56.98% distilled water, 43% ethanol, and 0.02% of a carboxyvinyl polymer viscosity builder (commercially available from the B.F. Goodrich Company under the trade designation "Carbopol 941"). The orifice tip size was 0.61 mm, the jet length 0.5 inches, and the shell composition temperature 160°C. The fill was found to be 71% of the total capsule volume. Capsule yield was 62% and half-life was about 0.3 years.

This example was repeated with 0.1% surfactant in the shell composition, the surfactant comprising a mixture of

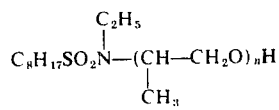

wherein $n$=2–8. Experimental conditions and the fill were maintained the same. Yield of satisfactory capsules increased from 62% to about 91% (about 50% increase) and the half-life increased from about 0.3 years to 0.77 years, (increase of about 157%).

EXAMPLE 15

This example illustrates the effect of utilizing surfactant in a beeswax capsule composition.

The capsule forming equipment described in Example 1 was utilized to encapsulate 98.5% distilled water and 1.5% interpolymer of methyl vinyl ether and maleic anhydride (commercially available from the General Aniline and Film Company under the trade designation "Gantrez AN-169"). The shell comprised 100% sunbleached white beeswax. Operating conditions were: nozzle jet length 3 inches; shell composition temperature 130°C.; and orifice tip diameter 0.61 mm. The fill comprised 68% by volume of the total capsule and the yield of good capsules was 67%.

This example was repeated utilizing the same conditions and materials, but with 0.1% surfactant in the shell composition, said surfactant comprising a mixture of

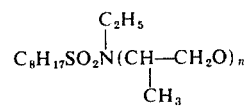

wherein $n$=2–8. Percent yield 78%, a significant increase over the 67% obtained without use of surfactant.

EXAMPLE 16

This example illustrates capsules formed using surfactant in the shell material, the capsules not being formable without use of surfactant.

A chlorofluorocarbon wax (commercially available from the Minnesota Mining and Manufacturing Company under the trade designation "KEL-F 200") was utilized as the shell composition in an attempt to encapsulate a fill comprising 70% isopropyl alcohol and 30% water using the equipment described in Example 1. The shell composition temperature was 140°C. and was slowly increased during the course of the trial to 180°C. with no significant effect on capsule quality. A very small number of capsules were formed, most of them comprising groups of capsules adhered to each other. All of the capsules were cracked and/or contained holes in the shell and none were satisfactory for use.

0.5% by weight of the fluorocarbon surfactant utilized in Example 15 was incorporated in the shell composition and capsules again produced utilizing a shell temperature of 170°C. Excellent capsules were obtained with approximately 88% of the capsule volume being fill. The capsule shell was strong and solid containing no pin holes or cracks.

EXAMPLE 17

This example illustrates use of silicone surfactant in a gelatin shell composition.

The equipment described in Example 1 was utilized in an attempt to encapsulate 90% light mineral oil and 10% orange flavor concentrate (commercially available from the Fritzsche Bros. Company under the trade designation "Orange Flavor No. 100766062") in a shell comprising 15.23% gelatin (commercially available from the P. Liener & Sons Company under the trade designation "C. L. -Ex- 1443"), 84.00% distilled water, 0.73% ethanol, 0.01% thymol, 0.03% Atlas Red 2 food coloring. The fill temperature was maintained at −10°C., the shell temperature at 30°C., and an orifice tip of 0.63 mm. used. The biliquid column of shell composition and fill failed to form droplets and did not provide capsules.

The preceding example was repeated with 0.01% of silicone surfactant (commercially available from the Union Carbide Corporation under the trade designation "L-77") in the shell composition. Excellent capsules having uniformly thick shells were obtained in about 95% yield.

EXAMPLE 18

This example illustrates the use of organic surfactants in Methocel shells to encapsulate mineral oil.

The encapsulation equipment described in Example 1 was utilized in an attempt to encapsulate 100% light mineral oil within a shell comprising a dispersion of 15% hydroxy-propylmethyl cellulose (commercially available from the Dow Chemical Company under the trade designation "Methocel 60HG4000") in distilled water at 90°C. The fill temperature was maintained at 24°C., the shell composition temperature at 90°C., and an orifice tip size of 0.65 mm. was used. The biliquid column turned inside out and attempted to coat mineral oil on solid spheres of shell material. Satisfactory capsules were not obtained.

The proceding experiment was repeated with 0.5% sodium dioctylsulfosuccinate in the shell composition, excellent capsules being formed in about 95% yield.

EXAMPLE 19

This example illustrates attempts to encapsulate flavoring oils in carbohydrate shells.

The encapsulation equipment described in Example 1 was utilized in an attempt to encapsulate 100% lime flavor oil (commercially available from the Norda Company under the trade designation "NORDA EP1120") in a shell comprising 80% mannitol and 20% sorbitol. Temperature of the fill was maintained at 24°C., the shell composition at 180°C., and a 0.325 mm. orifice tip used. No capsules were formed.

This experiment was repeated with 2.0% sodium dioctylsulfosuccinate in the shell composition, excellent, clear capsules being formed in about 90% yield.

EXAMPLE 20

The encapsulation equipment described in Example 1 was used to encapsulate a fill comprising 20% orange oil and 80% light mineral oil in an aqueous dispersion of hydroxypropyl cellulose (commercially available from Hercules Incorporated under the trade designation "Klucel G") containing 2.0% sodium dioctylsulfosuccinate as the shell composition. The shell composition was maintained at 90°C. during encapsulation. Excellent capsules were obtained. No capsules were obtained without use of a surfactant.

EXAMPLE 21

The encapsulation equipment described in Example 1 was used to encapsulate the fill of Example 20 in a shell composition comprising 68% mannitol, 30% refined cane sugar, and 2% sodium alkyl aryl sulfonate (commercially available from the Monsanto Company, Inorganic Chemical Division, under the trade designation "Santomerse No. 3 Paste"). Excellent capsules were obtained in 90% yield. No capsules were obtained without use of a surfactant.

What is claimed is:

1. Capsules consisting essentially of a central core of organic fill liquid surrounded and enclosed by an outer shell, said outer shell comprising a solidified organic shell-forming material selected from the group consisting of bees wax, paraffin wax, microcrystalline wax, sugars, natural gums, synthetic organic polymers, and gelatin, and, homogeneously dispersed therein, a surface tension lowering amount, not exceeding 10% by weight, of a surfactant, said surfactant selected from the group consisting of sodium dioctylsulfosuccinate, sodium carboxymethyl cellulose, sorbitan sesquioleate, silicones, and interpolymer of methyl vinyl ether and maleic anhydride, and mixtures thereof.

2. Capsules consisting essentially of a central core of organic fill liquid surrounded and enclosed by an outer shell, said outer shell comprising at least one sugar, and, homogeneously dispersed therein, a surface tension lowering amount, not exceeding 10% by weight, of sodium dioctylsulfosuccinate.

3. Capsules consisting essentially of a central core of organic fill liquid surrounded and enclosed by an outer shell, said outer shell comprising gelatin, and, homogeneously dispersed therein, a surface tension lowering amount, not exceeding 10% by weight, of an organo-silicone.

4. Capsules consisting essentially of a central core of organic fill liquid surrounded and enclosed by an outer shell, said outer shell comprising a solidified organic shell-forming material selected from the group consisting of bees wax, paraffin wax, microcrystalline wax, sugars, natural gums, synthetic organic polymers, and gelatin, and, homogeneously dispersed therein, a surface tension lowering amount, not exceeding 10% by weight, of a surfactant having the formula

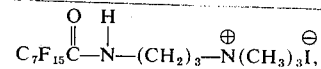

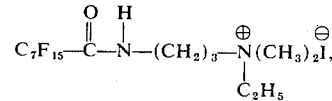

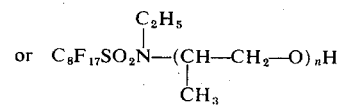

wherein $n$ represents an integer from 2 to 8 inclusive;

5. Capsules according to claim 4 wherein said outer shell comprises paraffin wax.

6. A process of forming capsules comprising a central core of fill surrounded by an outer shell, said process comprising: providing a mixture by dissolving a surface tension-lowering amount of a surfactant in an organic shell-forming material which is in a liquid state, said organic shell-forming material being selected from the group consisting of bees wax, paraffin wax, microcrystalline wax, sugars, natural gums, synthetic organic polymers, and gelatin, said surfactant selected from the group consisting of sodium dioctylsulfosuccinate, sodium carboxymethyl cellulose, sorbitan sesquioleate, silicones, an interpolymer of methyl vinyl ether and maleic anhydride, and mixtures thereof, providing a core stream of liquid fill material enclosed by an outer concentric substantially cylindrical stream of said mixture and thereafter causing said outer concentric stream to constrict into substantially spherical incipient shells enclosing portions of said liquid fill material, whereby the said capsules are obtained upon solidification of said incipient shells.

7. A process of forming capsules comprising a central core of fill surrounded by an outer shell, said process comprising: providing a mixture by dissolving a surface tension-lowering amount of a surfactant in an organic shell-forming material which is in a liquid state, said organic shell-forming material being selected from the group consisting of bees wax, paraffin wax, microcrystalline wax, sugars, natural gums, synthetic organic polymers, and gelatin, and said surfactant being an organo-silicone; providing a core stream of liquid fill material enclosed by an outer concentric substantially cylindrical stream of said mixture and thereafter causing said outer concentric stream to constrict into substantially spherical incipient shells enclosing portions of said liquid fill material, whereby the said capsules are obtained upon solidification of said incipient shells.

8. A process of forming capsules comprising a central core of fill surrounded by an outer shell, said process comprising: providing a mixture by dissolving a surface tension-lowering amount of a surfactant in an organic shell-forming material which is in a liquid state, said organic shell-forming material being selected from the group consisting of beeswax, paraffin wax, microcrystalline wax, sugars, natural gums, synthetic organic polymers, and gelatin, said surfactant being a compound having the formula

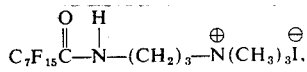

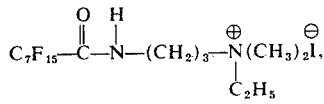

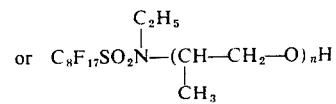

wherein $n$ represents an integer from 2 to 8 inclusive.

providing a core stream of liquid fill material enclosed by an outer concentric substantially cylindrical stream of said mixture and thereafter causing said outer concentric stream to constrict into substantially spherical incipient shells enclosing portions of said liquid fill material, whereby the said capsules are obtained upon solidification of said incipient shells.

* * * * *

UNITED STATES PATENT OFFICE
CERTIFICATE OF CORRECTION

Patent No. 3,779,942        Dated December 18, 1973

Inventor(s)    Theodore F. Bolles

It is certified that error appears in the above-identified patent and that said Letters Patent are hereby corrected as shown below:

Column 4, line 51 (Example 9), in the column headed "Surfactant" insert -- % -- after "0.1" and before "Fluorocarbon"; and line 64, footnote 5, that portion of the formula reading "$C_7F_{17}$" should read -- $C_7F_{15}$ -- .

Column 5, line 37, that portion of the formula reading "$C_8H_{17}$" should read -- $C_8F_{17}$ -- .

Column 6, line 2, that portion of the formula reading "$C_8H_{17}$" should read -- $C_8F_{17}$ -- ; and line 35, that portion of the formula "$C_8H_{17}$" should read -- $C_8F_{17}$ -- .

Column 7, line 13 (at the beginning of the line), insert the number sign -- # -- before the "2"; and line 41, change "proceding" to -- preceding -- .

Column 10, line 23 (at the end of the line), after "inclusive" change the period (.) to a semi-colon -- ; -- .

Signed and sealed this 24th day of September 1974.

(SEAL)
Attest:

McCOY M. GIBSON JR.        C. MARSHALL DANN
Attesting Officer           Commissioner of Patents